(12) United States Patent
Bachran et al.

(10) Patent No.: US 9,172,803 B2
(45) Date of Patent: Oct. 27, 2015

(54) SYSTEM AND METHOD FOR INTEGRATING RUNTIME USAGE STATISTICS WITH DEVELOPING ENVIRONMENT

(75) Inventors: Michael Bachran, Bornheim (DE); Stefan Besling, Dusseldorf (DE); Martin Mauelshagen, North Rhine-Westfalia (DE); Hanno Wiegard, Bad Honnef (DE)

(73) Assignee: Aspect Software, Inc., Chelmsford, MA (US)

( * ) Notice: Subject to any disclaimer, the term of this patent is extended or adjusted under 35 U.S.C. 154(b) by 672 days.

(21) Appl. No.: 12/860,736

(22) Filed: Aug. 20, 2010

(65) Prior Publication Data

US 2011/0044435 A1    Feb. 24, 2011

Related U.S. Application Data

(60) Provisional application No. 61/236,123, filed on Aug. 23, 2009.

(51) Int. Cl.
  *G06F 9/44* (2006.01)
  *H04M 3/493* (2006.01)
  *H04L 29/06* (2006.01)

(52) U.S. Cl.
  CPC ......... *H04M 3/4938* (2013.01); *H04L 65/1006* (2013.01); *H04L 65/1063* (2013.01); *H04M 3/493* (2013.01); *H04M 3/4936* (2013.01); *H04M 2201/40* (2013.01); *H04M 2203/355* (2013.01)

(58) Field of Classification Search
  USPC ................. 717/100; 379/88.01, 88.17, 88.18; 704/9, 270.1, 275, 257, 274; 715/234, 715/700, 810; 709/217, 227; 705/34, 26.81, 705/74, 1; 718/100; 726/22
  IPC .......................... H04M 3/22,3/5166, 2203/355
  See application file for complete search history.

(56) References Cited

U.S. PATENT DOCUMENTS

| 6,922,411 | B1 | 7/2005 | Taylor | |
| 7,673,340 | B1 * | 3/2010 | Cohen et al. | 726/22 |
| 2002/0198719 | A1 * | 12/2002 | Gergic et al. | 704/270.1 |

(Continued)

OTHER PUBLICATIONS

Voxeo1, "Voxeo Designer 2.0", Feb. 2002, pp. 1-3 <Voxeo2.0.pdf>.*

(Continued)

*Primary Examiner* — Tuan Vu
(74) *Attorney, Agent, or Firm* — Husch Blackwell LLP

(57) ABSTRACT

A self-help application such as in an interactive voice response (IVR) platform serving users is enabled for providing an integrated development (IDE) and monitoring environment. This provides real-time reporting and analysis on user behavior, application performance and transaction success. The application is coded in software objects (VoiceObjects) specific to the context of the application. These are pre-built objects that include dialog components, resource management, logic, actions, layer and business tasks. This object-oriented approach uncouples the underlying technology from the application and allows designers to build user-friendly applications. In one embodiment, Java or VoiceXML codes are generated dynamically from these objects and executed by a browser in the IVR. A set of core metrics is defined for each object type as well as configurable levels for these metrics. Data associated with individual objects are collected, aggregated, analyzed and displayed in context by the IDE.

16 Claims, 12 Drawing Sheets

(56) References Cited

U.S. PATENT DOCUMENTS

| | | | |
|---|---|---|---|
| 2003/0046316 A1* | 3/2003 | Gergic et al. | 707/513 |
| 2003/0171925 A1* | 9/2003 | Werner | 704/270.1 |
| 2004/0140989 A1* | 7/2004 | Papageorge | 345/700 |
| 2004/0249650 A1* | 12/2004 | Freedman et al. | 705/1 |
| 2005/0043953 A1* | 2/2005 | Winterkamp et al. | 704/275 |
| 2006/0242598 A1* | 10/2006 | Marascio et al. | 715/810 |
| 2007/0041525 A1* | 2/2007 | Tingley et al. | 379/88.17 |
| 2007/0041528 A1* | 2/2007 | Menon et al. | 379/90.01 |
| 2008/0008297 A1* | 1/2008 | Gurfein et al. | 379/88.01 |
| 2008/0019500 A1* | 1/2008 | Torres et al. | 379/265.02 |
| 2008/0208587 A1* | 8/2008 | Ben-David et al. | 704/275 |
| 2009/0228264 A1* | 9/2009 | Williams et al. | 704/9 |

OTHER PUBLICATIONS

Voxeo2, "Designer Tour", Jun. 2008—p. 1-2 <VXml_EVOL08.pdf>.*

* cited by examiner

SYSTEM AND METHOD FOR INTEGRATING RUNTIME USAGE STATISTICS WITH DEVELOPING ENVIRONMENT

CROSS-REFERENCE TO RELATED APPLICATION

The benefit is claimed of U.S. provisional patent application of Michael Bachran, Stefan Besling, Martin Mauelshagen, and Hanno Wiegard, Application 61/236,123 filed on Aug. 23, 2009.

FIELD OF THE INVENTION

The present invention relates to telecommunication and networked computer and computer telephony systems including the Internet and the Public Switched Telephone System, and more particularly to an interactive self-help application platform supporting multi-channels.

BACKGROUND OF THE INVENTION

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

The Internet is a worldwide network of IP networks communicating under TCP/IP. Specifically, voice and other multimedia information are transported on the Internet under the VoIP (Voice-over-IP) protocol, and under the H.323 standard that has been put forward for interoperability. Another important implementation of VOIP protocol is SIP ("Session Initiation Protocol".)

The integration of the PSTN and the IP networks allows for greater facility in automation of voice applications by leveraging the inherent routing flexibility and computing accessibility in the IP networks.

An example platform for easy deployment of telephony applications is described in U.S. Pat. No. 6,922,411, which entire disclosure is incorporated herein by reference. Essentially, a networked telephony system allows users to deploy on the Internet computer telephony applications associated with designated telephone numbers. The telephony application is easily created by a user in XML (Extended Markup Language) with predefined telephony XML tags (e.g. VoiceXML) and easily deployed on a website. The telephony XML tags include those for call control and media manipulation. A call to anyone of these designated telephone numbers may originate from anyone of the networked telephone system such as the PSTN (Public Switched Telephone System), a wireless network, or the Internet. The call is received by an application gateway center (AGC) installed on the Internet. Analogous to a web browser, the AGC provides facility for retrieving the associated XML application from its website and processing the call accordingly.

This type of telephony platform allows very power yet simple telephony applications to be built and deployed on the Internet. The following are some examples of the telephony applications deployed on this platform. A "Follow me, find me" application sequentially calls a series of telephone numbers as specified by a user until one of the numbers answers and then connects the call. Otherwise, it does something else such as takes a message or sends e-mail or sends the call to a call center, etc. In another example, a Telephonic Polling application looks up from a database the telephone numbers of a population to be polled. It then calls the numbers in parallel, limited only by the maximum number of concurrent sessions supported, and plays a series of interactive voice prompts/messages in response to the called party's responses and records the result in a database, etc. In another example, a Help Desk application plays a series of interactive voice prompts/messages in response to the called party's responses and possibly connects the call to a live agent as one option, etc. In yet another example, a Stock or Bank Transactions application plays a series of interactive voice prompts/messages in response to the called party's responses and conducts appropriate transactions with a backend database or web application, etc.

The latter examples are generally referred to as self-help applications. In the voice context, a self-help application is referred to as IVR. IVR refers to Interactive Voice Response and is a technology that automates interaction with telephone callers. Enterprises are increasingly turning to IVR to reduce the cost of common sales, service, collections, inquiry and support calls to and from their company.

Historically, IVR solutions have used pre-recorded voice prompts and menus to present information and options to callers, and touch-tone telephone keypad entry to gather responses. Modern IVR solutions also enable input and responses to be gathered via spoken words with voice recognition.

IVR solutions enable users to retrieve information including bank balances, flight schedules, product details, order status, movie show times, and more from any telephone. Additionally, IVR solutions are increasingly used to place outbound calls to deliver or gather information for appointments, past due bills, and other time critical events and activities.

The various voice applications described above are typically specified by application scripts coded in VoiceXML. Alternatively, the scripts can be coded using dialog objects. US Patent Application Publication No. 2005/0043953 A1 discloses a technique of building dialog control using dialog objects.

Historically, IVR solutions have used pre-recorded voice prompts and menus to present information and options to callers, and touch-tone telephone keypad entry to gather responses. Modern IVR solutions also enable input and responses to be gathered via spoken words with voice recognition.

IVR solutions enable users using voice as a medium or other form of inputs through a voice channel to retrieve information including bank balances, flight schedules, product details, order status, movie show times, and more from any telephone. Additionally, IVR solutions are increasingly used to place outbound calls to deliver or gather information for appointments, past due bills, and other time critical events and activities.

It is desirable for a developer of an application to know how a segment of code in the application interacts with users during runtime and have the usage statistics displayed against the segment of code so that any "hotspots" can easily be detected and rectified if desired. Similarly, insofar as the application represents a portal for conducting business, a business analyst will be interested in the statistics of customer usage and behavior.

SUMMARY AND OBJECTS OF THE INVENTION

A self-help application such as in an interactive voice response (IVR) platform serving users is enabled for providing an integrated development (IDE) and monitoring environment. This provides real-time reporting and analysis on user behavior, application performance and transaction success. The application is coded in software objects (VoiceObjects) specific to the context of the application. These are pre-built objects that include dialog components, resource management, logic, actions, layer and business tasks. This object-oriented approach uncouples the underlying technology from the application and allows designers to build user-friendly applications. In one embodiment, Java or VoiceXML codes are generated dynamically from these objects and executed by a browser in the IVR. A set of core metrics is defined for each object type as well as configurable levels for these metrics. Data associated with individual objects are collected, aggregated, analyzed and displayed in context by the IDE.

In a preferred embodiment, the technique provides an integrated development and analysis module with a library of software objects for coding an application script to implementing the self-help application. The application script is executed by generating runtime codes dynamically from the software objects coded in the application script. The runtime codes are in turn executed using a browser to implement the self-help application. During runtime, data associated with individual software objects are collected. The collected data enables reports to be generated and displayed using the integrated development and analysis module.

Thus the self-help application platform can provide real-time reporting and analysis on caller behavior, application performance, and transaction success. It eliminates time consuming data extraction, transformation and loading (ETL) processes by automatically collecting data in a database. And because the database is linked directly with the application development environment, any changes to applications are automatically reflected, reducing the time to manage and update reports.

Additional objects, features and advantages of the present invention will be understood from the following description of its preferred embodiments, which description should be taken in conjunction with the accompanying drawings.

DESCRIPTION OF THE PREFERRED EMBODIMENTS

The present system, with the application defined in terms of a configuration of VoiceObjects, rather than low level XML codes, allows easily access to these types of information.

Thus, the present analytic system allows various portions of the usage data described above to be presented within a development environment (IDE) in different views that are relevant e.g. to developers and business analysts. This makes the analysis more directly available for users who may not have access to Business Intelligence tools. Even more importantly it shows the analytics in the direct context of the application itself, so it becomes much easier to act on them.

The data that has been collected by the application server during calls is aggregated either in real time or in an offline process, and converted to a format in which it can be consumed by the IDE for presentation. On the basis of this data the IDE then performs certain computations and rankings to determine what should be presented to the user.

Previously integrations of runtime information with an IDE have been directed to the performance of the software code itself under runtime condition and not the behavior the users when using the application and how certain components of software design interact with the users.

Figure 1:
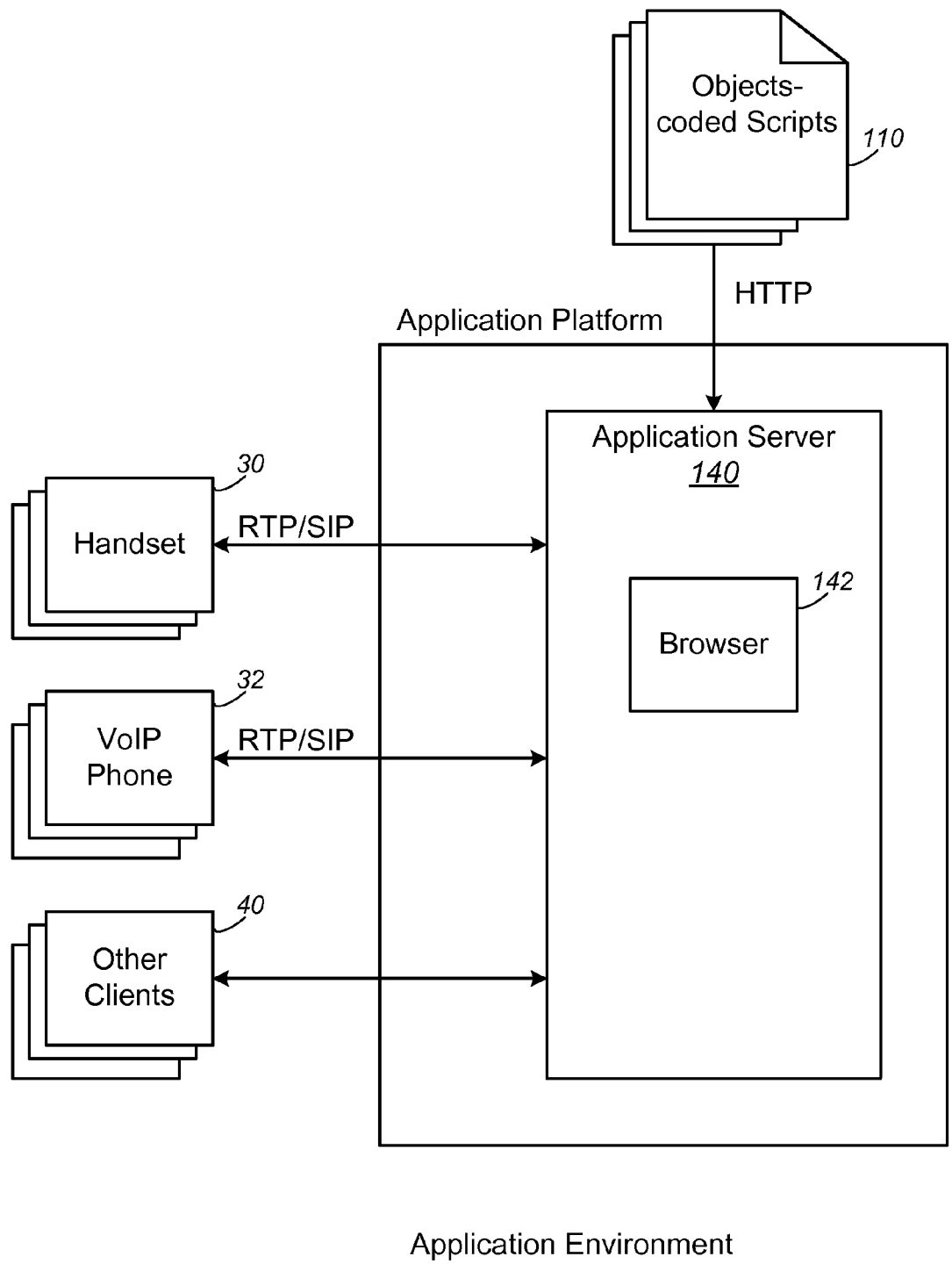
FIG. 1 illustrates schematically a telephony application platform hosting an application specified by an application script coded in software objects such as VoiceObjects.

FIG. 1 illustrates the telephony application platform that supports and runs an application, such as one to direct how a call is to be handled. When a user makes a call through a voice client such as a handset 30 or a VoIP phone 32 to the IVR, the voice application script 110 associated with the call number is retrieved. Other clients 40 may also interact with the application. A browser 142 executes or renders the retrieved voice application script 110 to allow the user to interact with the voice application. Such a voice application is specified by the voice application script with codes having voice-specific statements. As described above, typically such voice-specific statements can include VoiceXML tags. However, in this case, shown in FIG. 1, the building blocks of the application are the pre-built components, VoiceObjects themselves.

Since the various features to be provided by the voice application are well defined objects, such as menu items, certain tasks, etc, these can be abstracted at a higher level with pre-built components, hereinafter to be referred to as "VoiceObjects", which may be assembled, by dragging and dropping to develop the voice application rapidly.

Thus a VoiceObjects platform allows developers to create applications based on a library of pre-built components, VoiceObjects, which they drag and drop into a call flow and parameterize.

The objects contained in the VoiceObjects component library fall into these different categories:

Dialog Components—templates for dialog steps like playing a prompt (Output), configuring an input state (Input), a menu (Menu). Higher level components include a multi-step Confirmation and a List object that allows the user to browse through an entire list of array of data.

Resource Management—these objects manage resources like Audio or Grammar files. Connector objects encapsulate access to back-end systems, Log objects allow for custom log points (e.g., labels).

Logic—these objects represent variables and collections (variable arrays) and logic primitives like If, Case, Loop and Goto. With these logic objects, the call flow logic can be configured and seamlessly integrated with the definitions of the actual caller interaction as defined in the dialog components. This means that no low-level coding is required for implementing call logic.

Actions—these include objects like Hyperlinks (globally active grammars for menu shortcuts or commands like "back to main menu", "operator", "help"), Recordings, and agent transfers (Transfer).

Layer—Layers represent a technique that helps build personalized, customized and dynamic voice applications. Layers separate call logic from the user interface logic. Layers can be used, for example, to implement a single call flow with different skins for different caller profiles, different times of day or week, or different sets of prompts and grammars for DTMF versus voice.

Business Tasks—Business Task objects represent tasks that callers may perform within an application, such as obtaining an insurance quote or making a money transfer. Business Tasks allow the simple and comprehensive tracking of how well callers succeed in completing these tasks, and why they fail.

Figure 2:
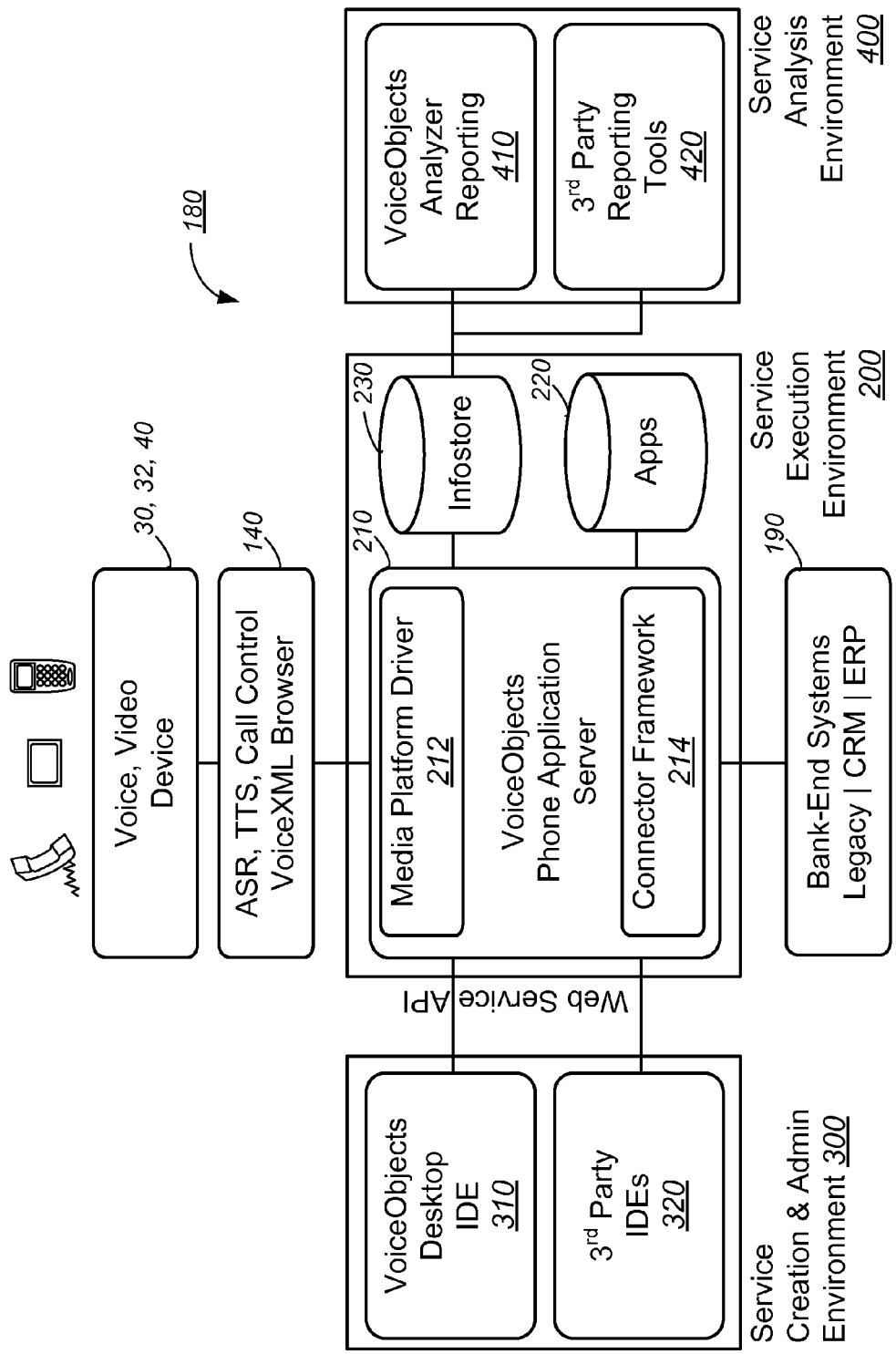
FIG. 2 illustrates the system in which the application is executed and its runtime statistics collected and analyzed and displayed.

FIG. 2 illustrates the system in which the application is executed and its runtime statistics collected and analyzed and displayed. The system 180 comprises a service execution environment 200, a service creation & admin environment 300 and a service analysis environment 400.

The service execution environment 200 has a number of components including a VoiceObjects application server 210, an application store 220 and an infostore 230.

The application store 220 stores voice and self-service applications. The VoiceObjects server 210 uses core objects as the building and configuring blocks for developing services. This object-oriented approach uncouples the underlying technology from the application and allows designers to build user-friendly applications with Java or VoiceXML coding. With modularity also comes the advantages of inheritance and easy reusability of components.

The VoiceObjects Server 210 provides efficient application execution and management. It helps to reduce the complexity of deploying and managing adaptive self-service phone portals. It enables highly scalable, carrier-grade deployment of personalized over-the-phone self-service applications.

In particular, it provides the ability to dynamically generate VoiceXML and to create personalized dialogs with each caller at call time, using information in an organization's CRM or other databases. It also provides an application execution environment that supports management and monitoring of multimodal applications, online application maintenance for instant changes or rollbacks, and guaranteed high availability. It also has web services support for easy integration between an organization's phone-based self-service assets and its CRM, ERP, and other IT assets in service-oriented architecture (SOA) environments. In a preferred embodiment, it has support for multimodal phone applications that may include voice, video, text and mobile Web interfaces, allowing user-friendly interactive applications.

The VoiceObjects application server 210 includes a media platform driver 212 and a connector framework 214 for interface with various operating systems, databases and web application servers.

The media platform driver 212 enables the VoiceObjects application server 210 to operate with various voice and text browsers, such as VoiceXML-based IVR systems 140, which are in turn accessed by voice and video clients 30, 32, 40. The media platform driver 212 also allows the VoiceObjects application server 210 to operate with voice and Unstructured Supplementary Service Data (USSD)-based browsers for text-based applications.

The connector framework 214 facilitates the backend integration of the VoiceObjects application server 210. In this way, Back-end integration Organizations 190 can easily integrate with any CRM, ERP or IT back-end systems, enterprise data or legacy applications with VoiceObjects' Web services, Java or HTTP connectors.

The service creation & admin environment module 300 provides a graphical integrated development environment within the VoiceObjects framework. It interfaces with the VoiceObjects application server 210 via a set of web service API. The module 300 includes a VoiceObjects desktop IDE 310 and optionally other $3^{rd}$ party IDEs 320. Developers can use the IDE of their choice through a provided XML-based development interface to the VoiceObjects server 210. These IDEs provide functionality to create and manage phone applications based on the VoiceObjects server 210.

Figure 3:
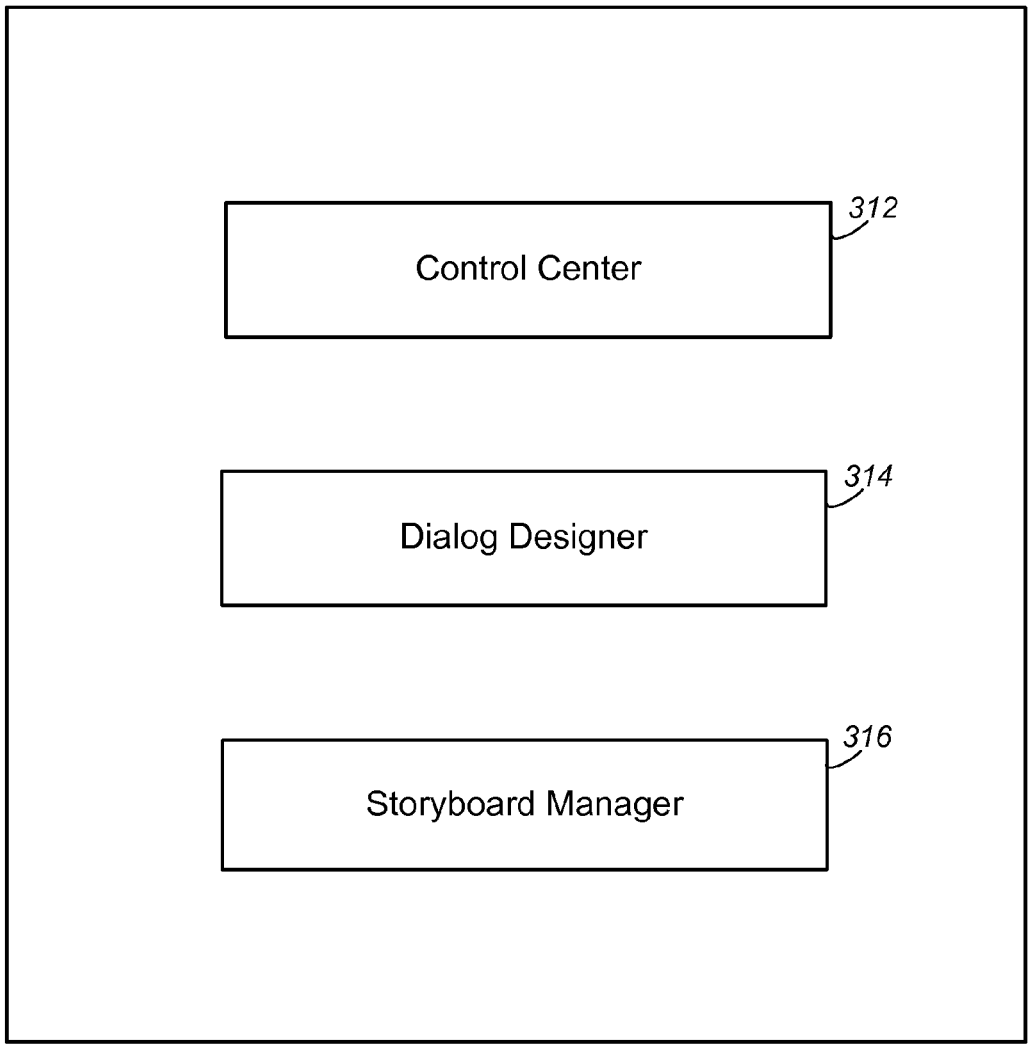
FIG. 3 illustrates components of the VoiceObjects desktop.

FIG. 3 illustrates components of the VoiceObjects desktop. The VoiceObjects desktop IDE 310 includes a control center 312, a dialog designer 314 and a storyboard manager 316. The control center 312 is a graphical, integrated management console enabling the deployment, management, and monitoring of servers and services. It delivers centralized live monitoring and management of services and servers.

The dialog designer 314 is the main work area for designing and developing applications. Dialog flows of objects are displayed in a tree structure and can be modified as needed within this graphical environment.

The storyboard manager 316 is VUI designer tool for managing application prompts. It has two subcomponents, storyboard manager for maintenance 317 and storyboard manager for design and migration 318. These two subcomponents allow for maintenance, migration and design-from-scratch prompt management. The storyboard manager for maintenance 317 allows a user to view and print prompt lists of different detail levels and modify the wording and filter settings of existing prompts. It also supports a re-import of any changes made to prompts into an existing application. The storyboard manager for design and migration 318 enables faster, less tedious prompt design for new voice projects and speeds up the migration of legacy IVR applications, cutting both prompt migration and new development time in half.

Key to delivering effective phone self-service is the ability to understand what customers are doing within self service applications—and most importantly, what they are experiencing—for a more proactive approach to application management. The VoiceObjects analyzer 410 is a service analysis environment 400 that enables instant analysis of key business, operational, and application design questions.

Infostore 230 is the logging component of VoiceObjects server 210 and stores information on the behavior of services and of the callers using them such as system usage, system and application performance, caller behavior, and recognition success.

The Infostore Repository 230 is based on a standard data warehouse schema and can be used directly by 3$^{rd}$ party business intelligence tools or reporting tools 420 for formatting, drilling down, slicing and dicing, and filtering data. Session data from Infostore is also seamlessly integrated with CRM data and applications 190 for custom reports. No additional consolidation or transformation is needed as data structures are kept consistent across the infrastructure and processes.

Figure 4:
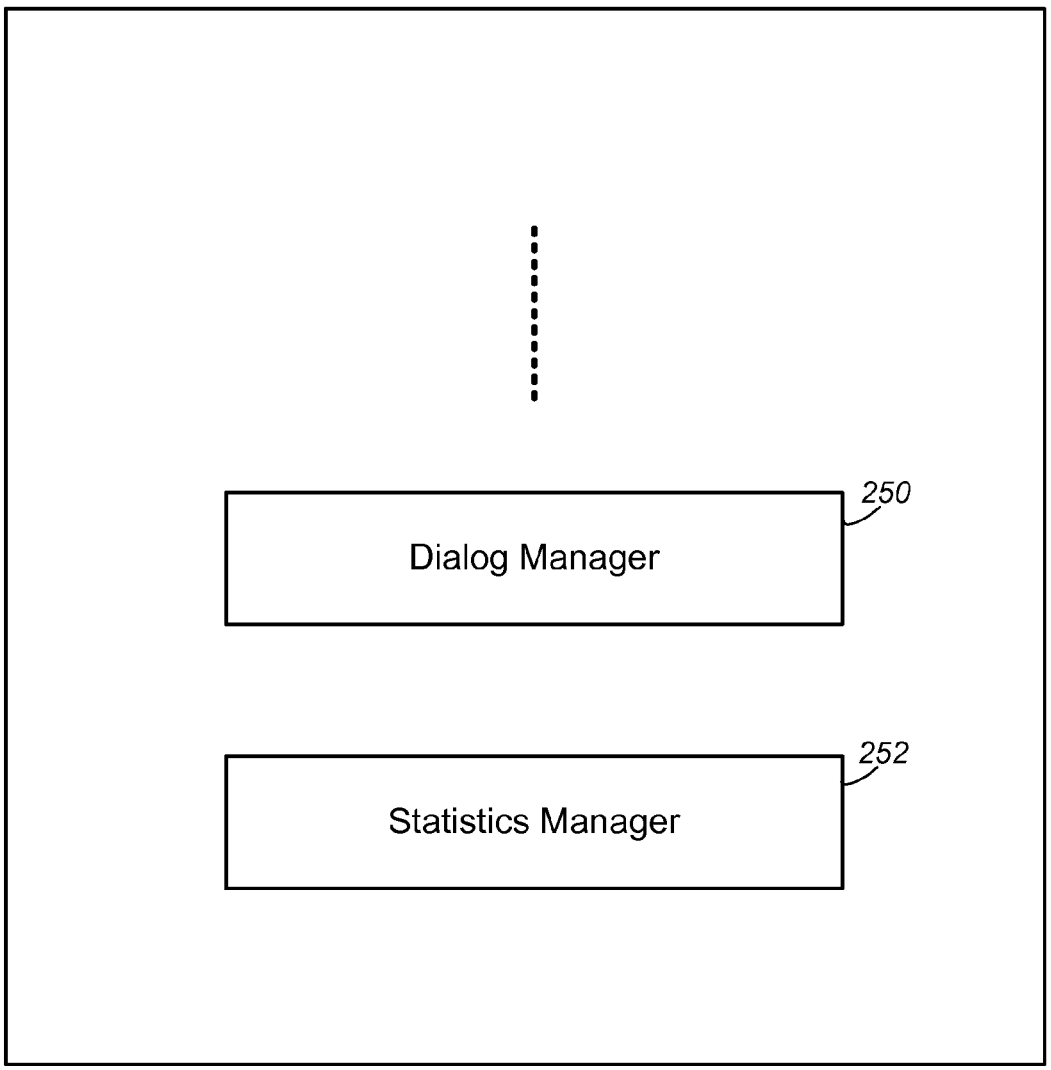
FIG. 4 illustrates the components of the VoiceObjects application server that are responsible for gathering usage data and generating statistics.

FIG. 4 illustrates the components of the VoiceObjects application server that are responsible for gathering usage data and generating statistics. The VoiceObjects application server 210 internally comprises a Dialog Manager 250 and a Statistics Manager 252. The Dialog Manager 250 drives the dialog interaction with the caller on the basis of the application scripts defined through the VoiceObjects. In doing so it collects information about the interaction including e.g. the caller's input, confidence values, events that occurred, etc. This information is aggregated in individual records and passed on to the Statistics Manager 252. The Statistics Manager 252 interacts directly with the Infostore database repository 230 and inserts the data records it received from the Dialog Manager 250 into the database.

Figure 5:
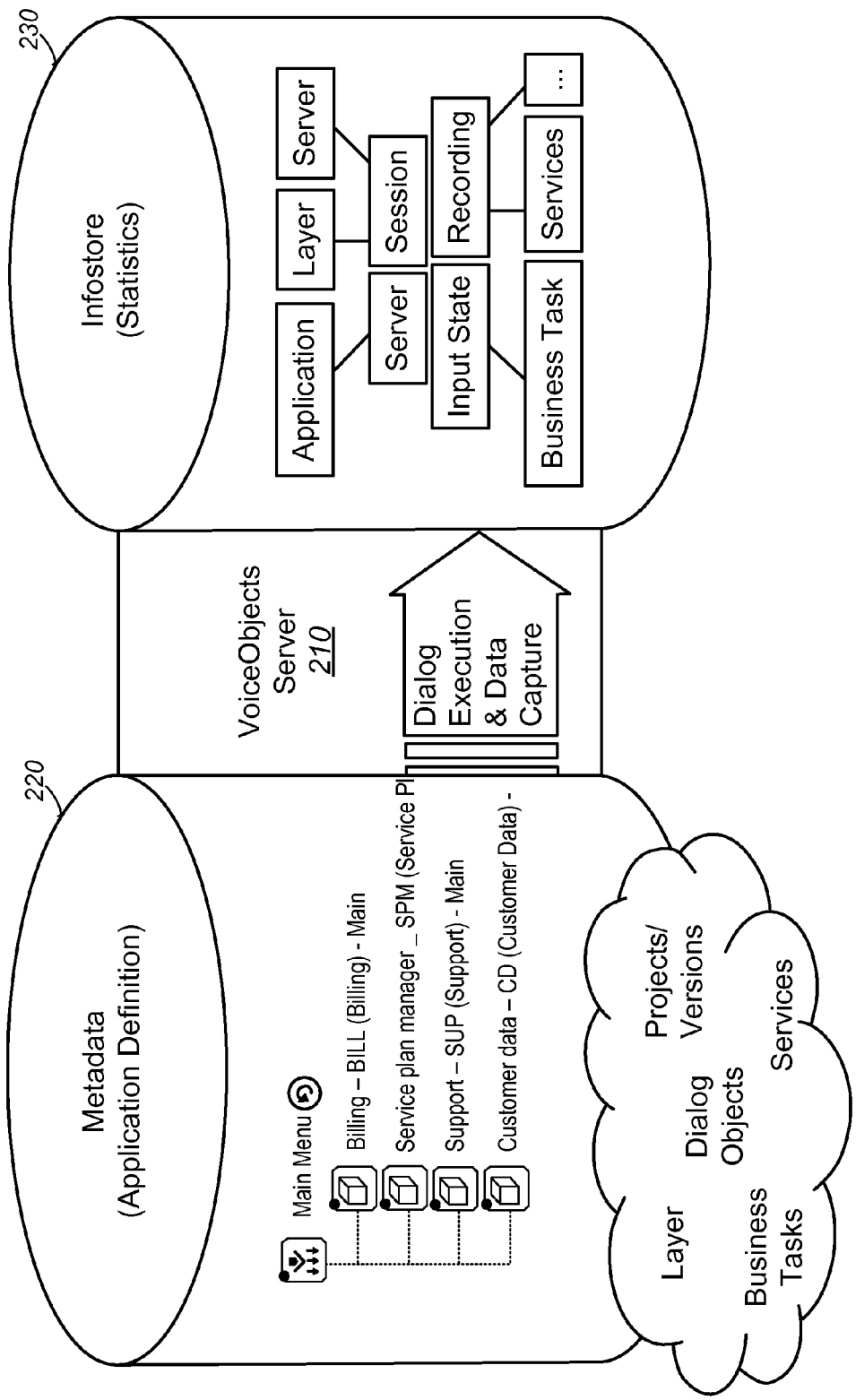
FIG. 5 illustrates the infostore shown in FIG. 2 in more detail.

FIG. 5 illustrates the infostore shown in FIG. 2 in more detail. The data that is logged covers in-depth information on how the caller navigated through the application and interacted with the individual objects in the dialog, including e.g. recognition quality or timing of processing steps. This data enables very sophisticated caller behavior analysis, which typically takes place within the framework of Business Intelligence tools such as SAP Business Objects or Micro Strategy.

The VoiceObjects analyzer 410 delivers reports that offer valuable insight into the usage and acceptance of services and integrates the data into common business intelligence frameworks in real time, providing up-to-the-minute graphical views of the status of the system. Predefined reports allow instant analysis of the more prevalent questions for business analysts and marketing specialists, dialog designers and developers, and administrators and system operators. Specific user groups can also create custom reports to suit their business, application development and tuning, or operational needs.

The VoiceObjects analyzer 410 enables real-time application feedback. When designers make an update to an application in the service creation environment, changes are automatically reflected in Infostore and in the reports for instant analysis. Analysts can review reports immediately without requiring additional load or transformation steps into a separate datamart or database.

Figure 6:
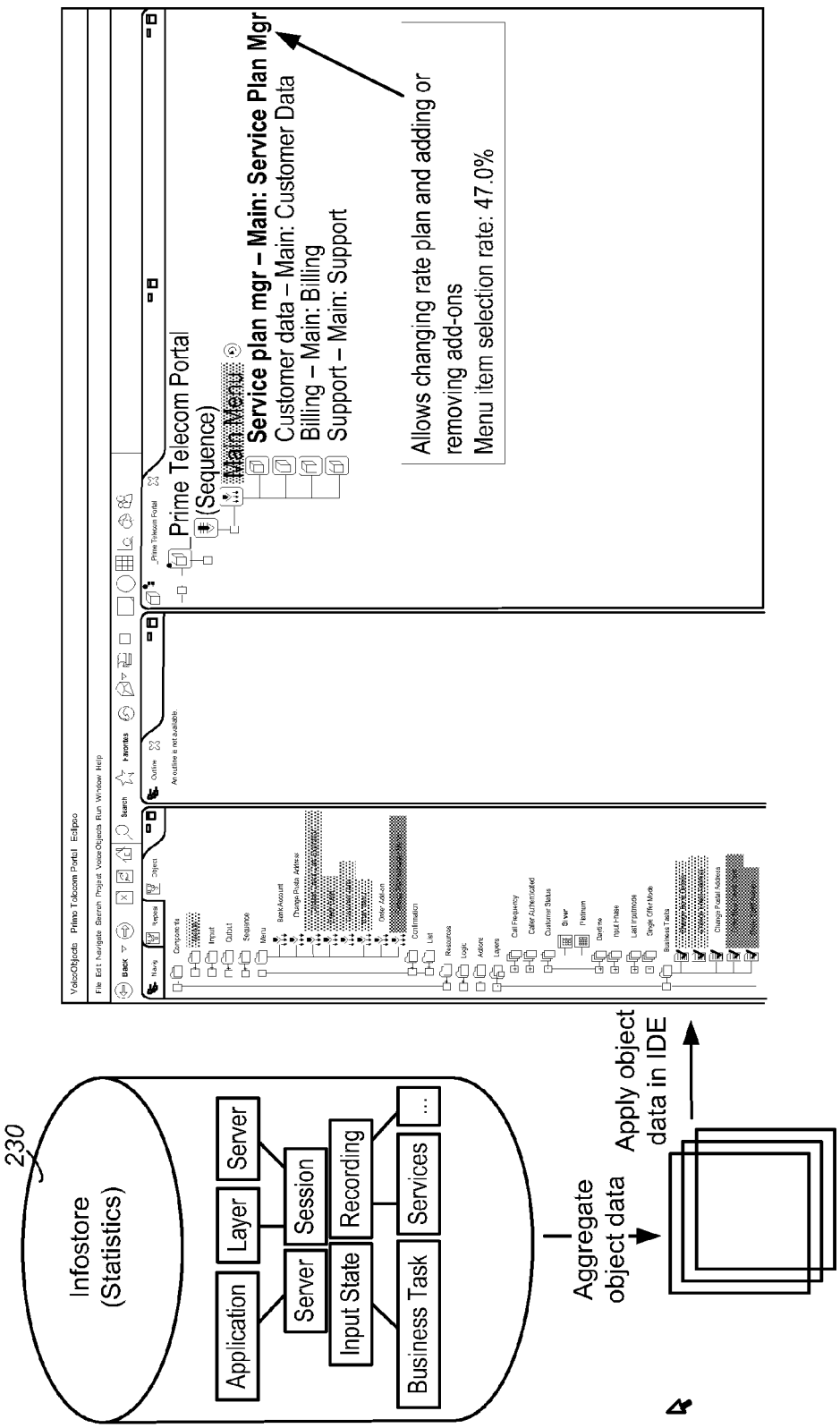
FIG. 6 illustrates aggregate object data from the infostore being displayed in context in the IDE.

FIG. 6 illustrates aggregate object data from the infostore being displayed in context in the IDE. Based on the information collected in this way, suitable aggregates can be produced for consumption by the IDE. These aggregates can e.g. be views, materialized views, or separate tables filled by periodic ETL ("Extract-Transform-Load") processes. The resulting aggregates are read by the IDE and form the basis for the adjustments of object displays within the IDE.

Interaction Hotspots

In the current implementation, the usage information collected by the application server is aggregated to the level of individual objects, which are the core building blocks of applications as outlined above. A set of core metrics is defined for each object type, as well as configurable levels for these metrics. Based on where an object's values for these metrics fall within these levels, the IDE decides on how to display the object.

Figure 7:
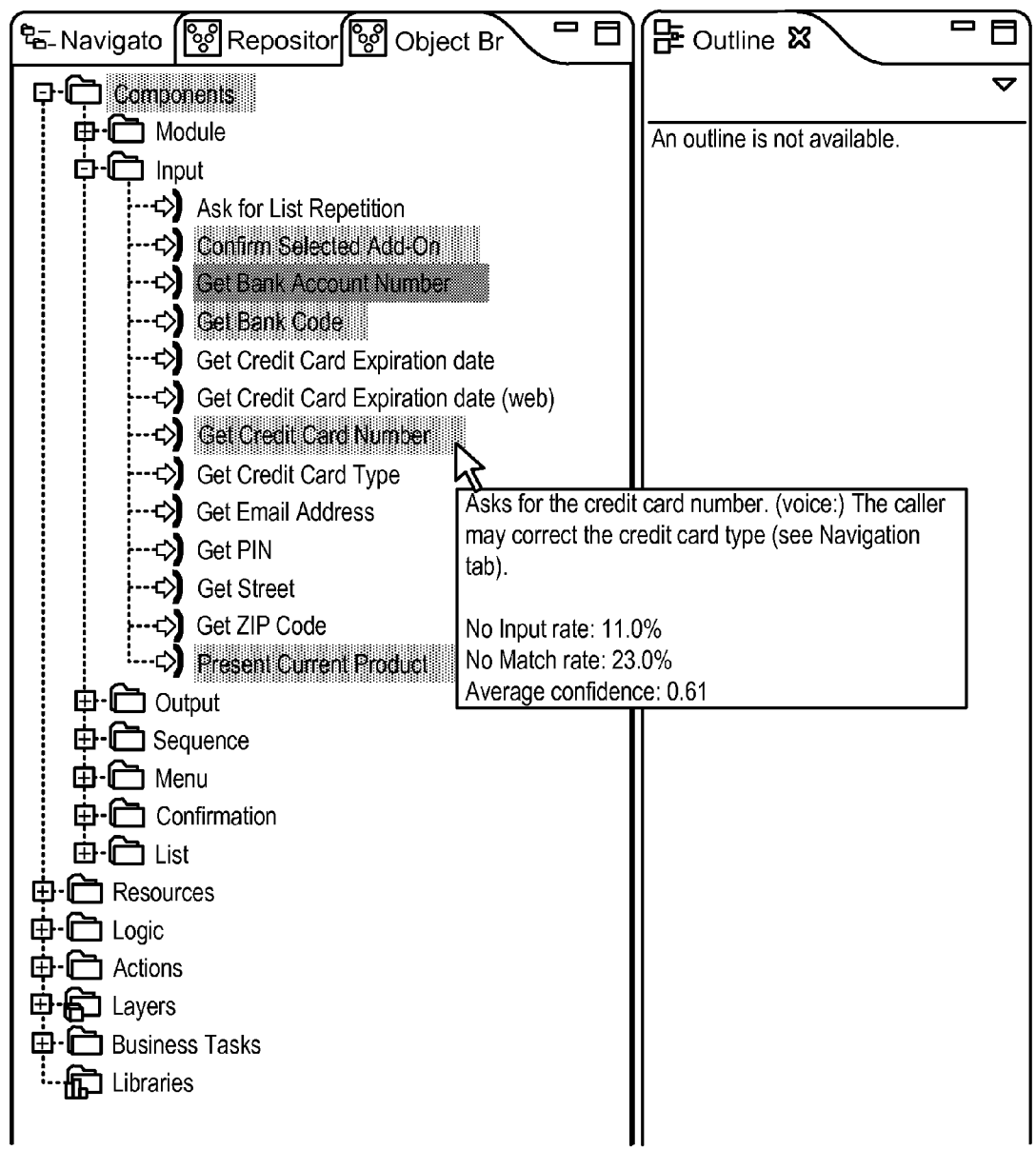
FIG. 7 illustrates an example of a view in the IDE displaying input objects.

FIG. 7 illustrates an example of a view in the IDE displaying input objects. In the example, metrics of No Input rate, No Match rate, and average confidence have been defined for Input objects that ask for certain free-form input from the caller (such as e.g. a bank account or credit card number). The Input object "Get Credit Card Number" has values that exceed the thresholds of the worst level, so the object is shown with a red marker to indicate that it has a problem. Detailed information including the actual values of the metrics for the object is shown in a tool tip for the object.

Figure 8:
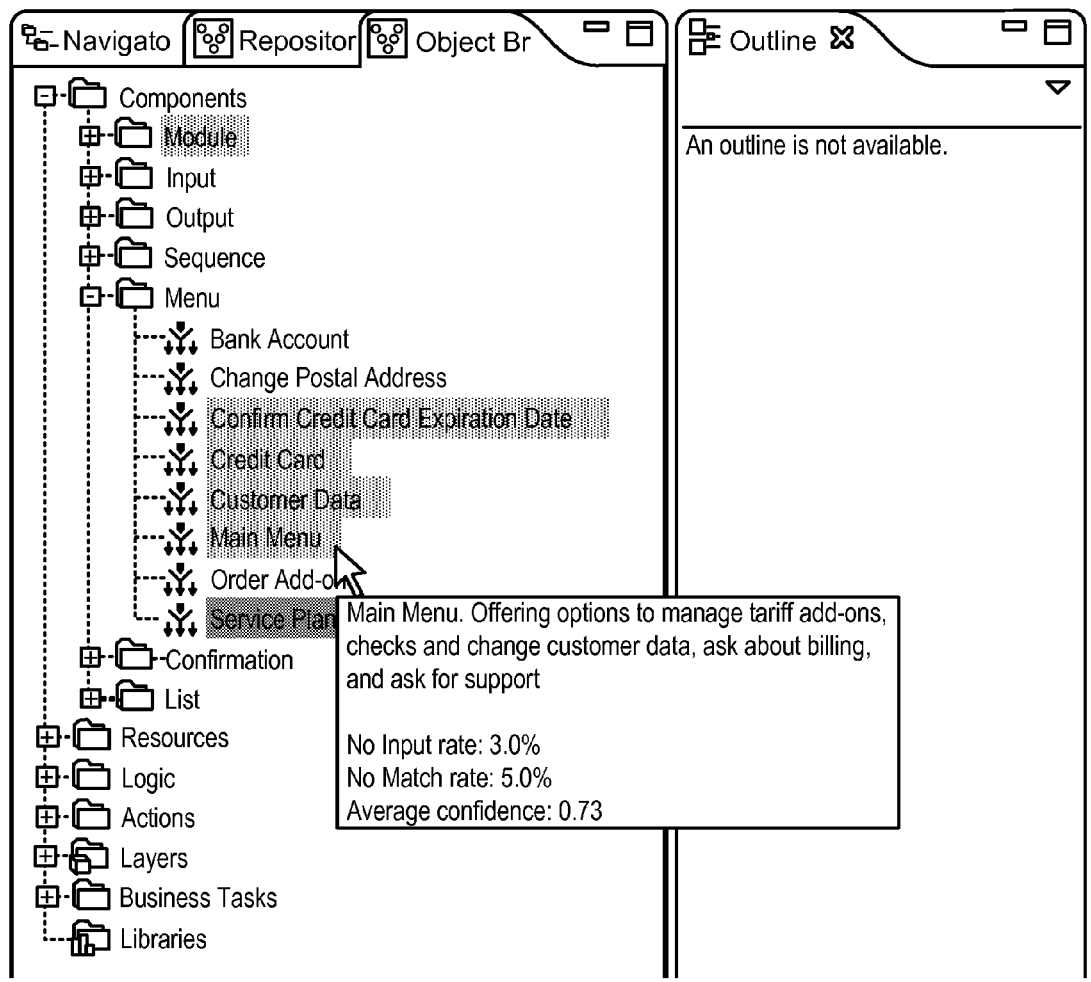
FIG. 8 illustrates another example of a view in the IDE displaying menu objects.

FIG. 8 illustrates another example of a view in the IDE displaying menu objects. In a second example, the same key metrics have been defined for Menu objects, which ask the caller to select from among a pre-defined set of choices. The Menu object "Main Menu" touches a configured intermediate level of 5% No Match rate, but stays below a configured 10% maximum level. Therefore it is shown with an orange (as opposed to red) marker. Again, detailed values are displayed in a tool tip.

In a similar fashion, all other objects that have direct caller interaction can be handled.

Flow Hotspots

Figure 9:
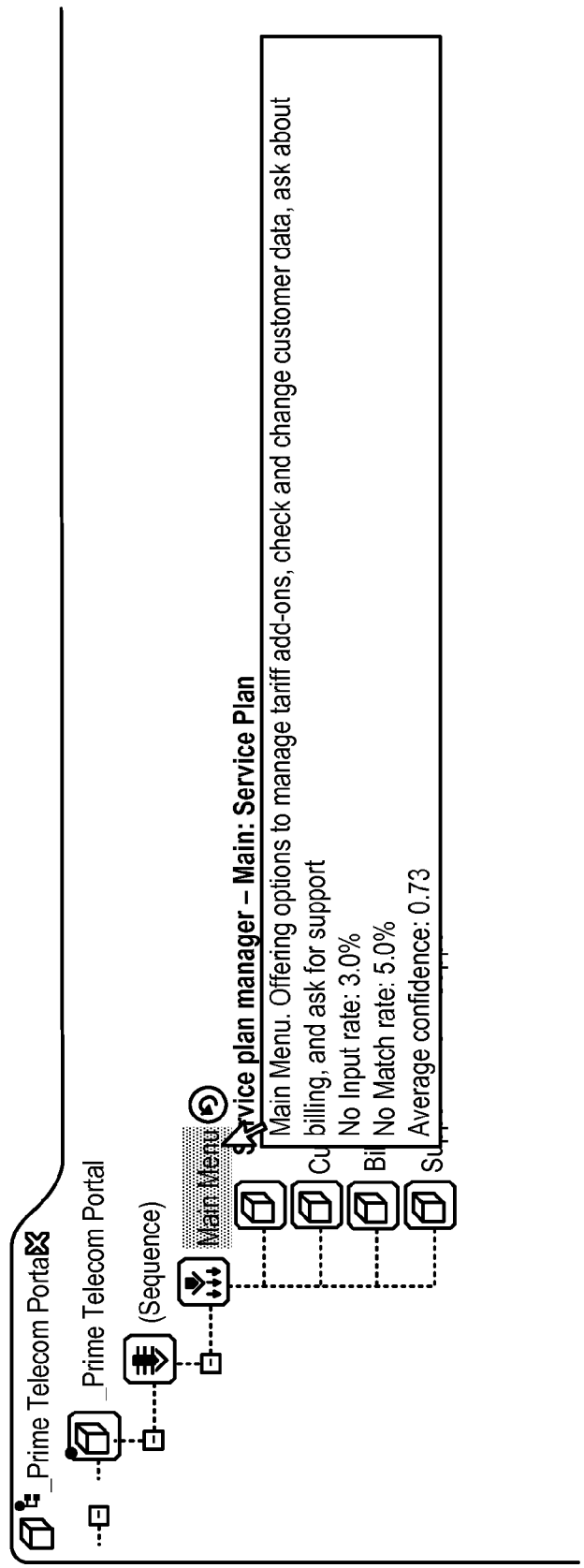
FIG. 9 illustrates an example of a view in the IDE displaying a tree view suitable for analyzing dialog flow.

FIG. 9 illustrates an example of a view in the IDE displaying a tree view suitable for analyzing dialog flow. Applications are constructed by combining objects into dialog flows, which here are represented by a tree view. The same information described above is also presented for the objects within their context in the dialog flow. This enables the developer to see potential problems in their context within the dialog flow, which is important since the root cause of the problem may not lie in the current object itself but e.g. in objects previously visited by the caller.

Figure 10:
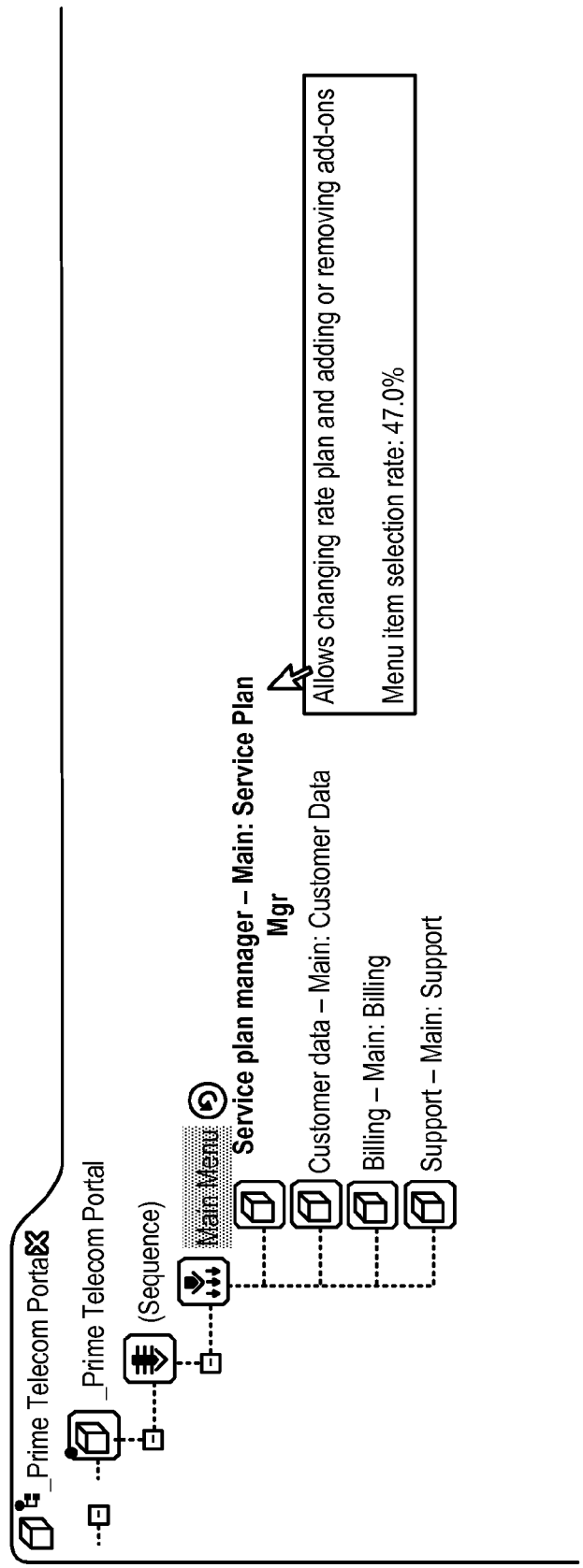
FIG. 10 illustrates the view of FIG. 8 to have the dominant paths taken by caller highlighted in bold.

FIG. 10 illustrates the view of FIG. 9 to have the dominant paths taken by caller highlighted in bold. In addition, the dialog flow also provides information on the dominant paths taken by callers. This information enables developers to focus their efforts on those portions of the application that a majority of callers actually uses. For Menu objects this is currently done by indicating percentages of choices in their respective tool tips, and by showing the name of the dominant choice in boldface.

Business Hotspots

Some of the information gathered during calls is primarily of interest to application developers, such as e.g. the No Input or No Match rates mentioned above. Other information is of interest to developers as well as business-oriented users. In the current implementation that applies particularly to information provided on Layer and Business Task objects.

Layers are used to model application customization and personalization. Frequent applications are e.g. time-dependent behavior (different greetings, different availability of human agents, etc.) as well as customer-group specific functionalities (e.g. extra functions for premium customers).

Figure 11:
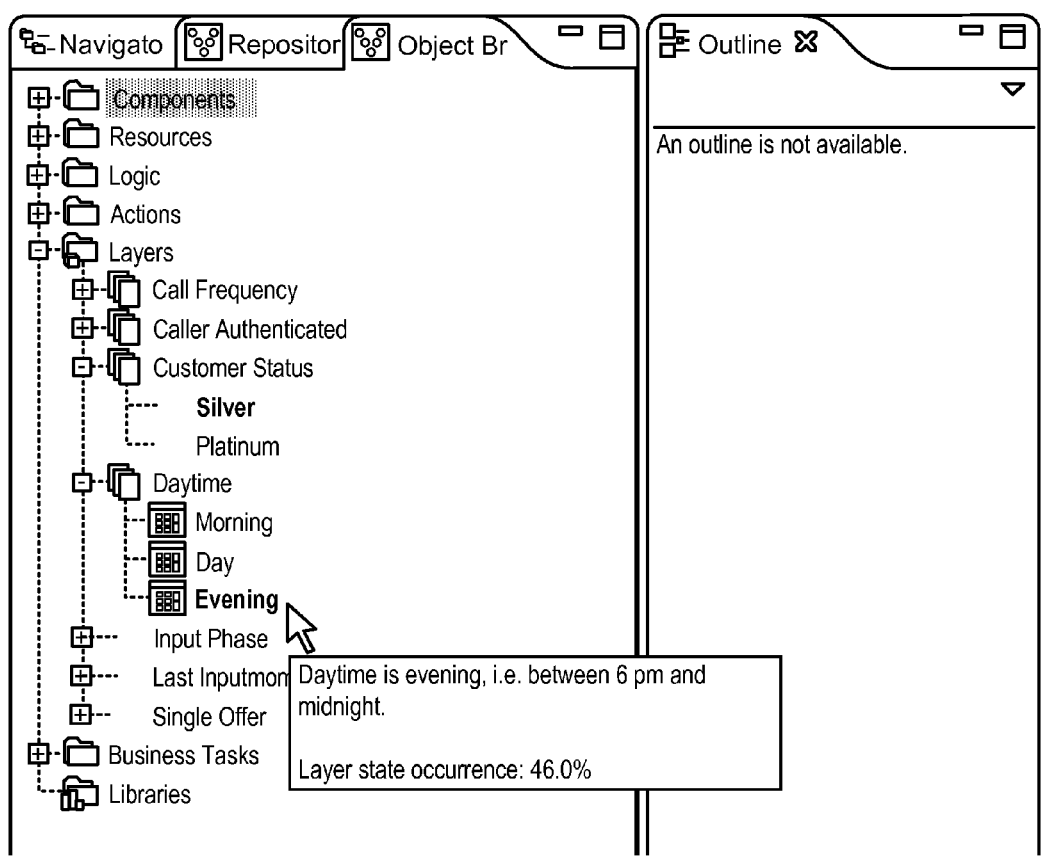
FIG. 11 illustrates an example of Layer objects being displayed in the IDE.

FIG. 11 illustrates an example of Layer objects being displayed in the IDE. The Layer objects currently indicate the occurrence percentage for each of their individual states; the dominant state is highlighted by boldface. In the example one can see e.g. that the majority of callers are of status "Silver" (and not the premium "Platinum"), and that the dominant time slot is the evening, probably after callers get home from work.

Developers can use this information to fine-tune the application to the needs and usage patterns of the dominant callers—or alternatively adjust the application to also attract more callers from other segments.

Business users can benefit from the information by aligning their marketing efforts with actual usage.

Business Task objects track the caller's success in achieving specific tasks within an application, and are designed to provide direct business value by providing insight specifically into why callers fail to achieve a task.

Figure 12:
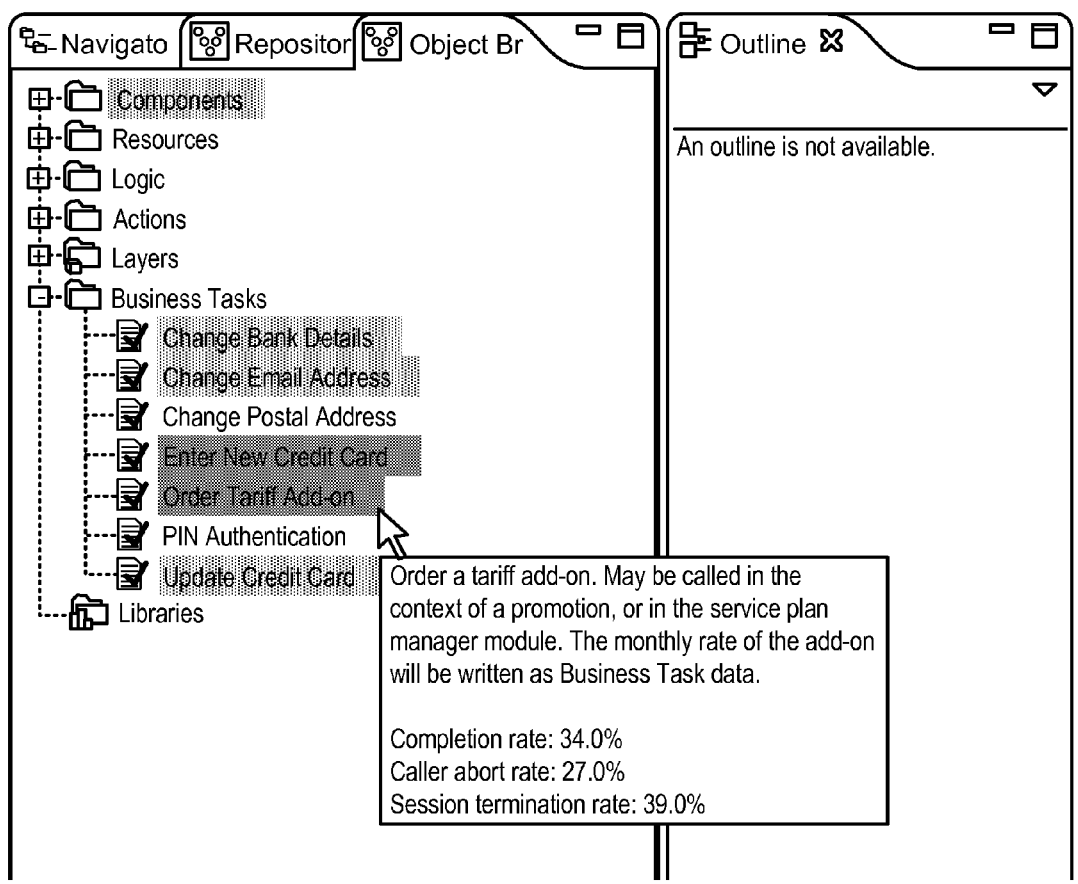
FIG. 12 illustrates an example of a view in the IDE in which business task objects are displayed.

FIG. 12 illustrates an example of a view in the IDE in which business task objects are displayed. In the current implementation, Business Task objects are color-coded in a similar way as described above, based on their successful completion rate and a configurable set of levels. In addition, the percentages of all task completions (successful and otherwise) and indicated in the tool tip. In the example it can be seen that the "Order Tariff Addon" task in which callers would order a new option for their mobile phone plan only succeeds in 34% of all cases. The remaining two third split into 27% who navigate elsewhere (e.g. because they changed their mind) and 39% who just hung up (e.g. because the new option was too expensive, or the ordering process was too cumbersome).

Developers can use this information to optimize the application and make it easier for callers to successfully complete currently "difficult" tasks.

Business users can correlate task completion rates with marketing and product material and determine e.g. whether many callers refrain from ordering a new option because it might just be too expensive.

VoiceObjects' integrated analytics can provide real-time reporting and analysis on caller behavior, application performance, and transaction success. VoiceObjects eliminates time consuming data extraction, transformation and loading (ETL) processes by automatically collecting data in the VoiceObjects Infostore database. And because Infostore is linked directly with the application development environment, any changes to applications are automatically reflected, reducing the time to manage and update reports.

While the embodiments and examples given in the description refer to interactive voice response applications, it should be understood that basically the VoiceObjects are core objects for dialog control on which a self-help, dialog-based application is built. An application server interprets these VoiceObjects to execute the self-help, dialog-based application. The techniques and structures described for gathering usage statistics and presenting them in context in the IDE are equally applicable to applications that interact not only with voice clients but other types of clients such as text messaging clients, video clients, etc.

While the embodiments of this invention that have been described are the preferred implementations, those skilled in the art will understand that variations thereof may also be possible.

It is claimed:

1. A method of operating a self-help application platform, comprising:
   providing an integrated development and analysis module with a library of prebuilt software voice objects for coding an application script to implement the self-help application;
   generating runtime codes dynamically from the software voice objects coded in the application script by, dragging and dropping the software voice objects, including generating personalized dialogs for calls at call time;
   executing the runtime codes with a browser to implement the self-help application;
   collecting usage and performance data associated with individual software voice objects during runtime and aggregating the data at a level of the individual software objects; and
   providing reports based on the collected usage and performance data associated with individual software voice objects using an integrated development and analysis module and using the aggregated data to automatically determine adjustment of object displays based upon defined core metrics and configurable levels of the metrics;
   displaying the reports in context of the individual software voice objects as represented in the integrated development and analysis module;
   wherein the reports include statistics of usage of a menu object in the application and provide information on dominant paths taken by callers including indicating percentages of menu object choices;
   wherein the reports include a tree view of aggregated software objects in a dialog flow and associated statistics of activity; and
   wherein the reports include time-dependent view of aggregate software objects and associated statistics of activity including tracking a caller's success in achieving specific tasks.

2. The method as in claim 1, wherein: each software object has a metric defined; and the collected usage and performance data includes values for metrics of the individual software objects.

3. The method as in claim 1, wherein the software objects are in object-oriented codes that model live context of the application.

4. The method as in claim 1, wherein the runtime codes are in Java.

5. The method as in claim 1, wherein the browser executes Java.

6. The method as in claim 1, wherein the runtime codes are in VoiceXML including Voice XML tags.

7. The method as in claim 1, wherein the browser executes VoiceXML.

8. A self-help application system, comprising:
   a pre-built software voice object server for executing an application script defined through software objects and having a dialog manager that drives user dialog interactions in the application script and collects and aggregates usage and performance data about the interactions during runtime aggregated to a level of the software objects;
   a service analysis environment module interacting with the software object server for generating reports from the collected usage and performance data;
   an integrated development environment (IDE) module interacting with the software object server, the IDE module having a graphical, integrated management console for developing the application script by enabling dragging and dropping the software voice objects and for deploying, managing and monitoring of servers and services in the system and for displaying the reports in context of the software objects as represented in the IDE and the IDE using the aggregated data to determine adjustment of object displays within the IDE based upon defined core metrics and configurable levels of the metrics;
   wherein the reports include statistics of usage of a menu object in the application and provide information on dominant paths taken by callers including indicating percentages of menu object choices;
   wherein the reports include a tree view of aggregated software objects in a dialog flow and associated statistics of activity; and wherein the reports include time-dependent view of aggregate software objects and associated statistics of activity including tracking a caller's success in achieving specific tasks.

9. The self-help application system as in claim 8, wherein: the software object server includes a dialog manager for collecting information on interaction of a user with the application and the collected usage and performance data includes user behavior and recognition success.

10. The self-help application system as in claim 9, wherein: the software object server includes a statistics manager for managing aggregated information from the dialog manager.

11. The self-help application system as in claim 8, wherein: each software object has a metric defined; and the usage and performance data collected includes values for the metrics of individual software objects.

12. The self-help application system as in claim 8, wherein the software objects are in object-oriented codes that models live context of the application.

13. The self-help application system as in claim 8, wherein the runtime codes are in Java.

14. The self-help application system as in claim 8, wherein the browser executes Java.

15. The self-help application system as in claim 8, wherein the runtime codes are in VoiceXML.

16. The self-help application system as in claim 8, wherein a browser executes VoiceXML.

\* \* \* \* \*